United States Patent
Bacchus

(10) Patent No.: US 7,149,848 B2
(45) Date of Patent: Dec. 12, 2006

(54) COMPUTER SYSTEM CACHE CONTROLLER AND METHODS OF OPERATION OF A CACHE CONTROLLER

(75) Inventor: Reza Mushtag Bacchus, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 335 days.

(21) Appl. No.: 10/787,444

(22) Filed: Feb. 26, 2004

(65) Prior Publication Data

US 2005/0193171 A1    Sep. 1, 2005

(51) Int. Cl.
    *G06F 12/00* (2006.01)

(52) U.S. Cl. .................. 711/118; 710/105; 710/311; 710/314; 710/315; 710/306

(58) Field of Classification Search ............ None
See application file for complete search history.

(56) References Cited

U.S. PATENT DOCUMENTS 5,860,081 A * 1/1999 Herring et al. ............ 711/100

OTHER PUBLICATIONS

Jeffrey D. Brown et al.; "IBM Enterprise X-Architecture Technology, Reaching the Summit," 1st Edition 2002, International Business Machines, 158 pp.

* cited by examiner

*Primary Examiner*—Reginald Bragdon
*Assistant Examiner*—Horace Flournoy

(57) ABSTRACT

In at least some embodiments, a computer system comprises a central processing unit ("CPU"), a bridge device coupled to a main memory, and a cache controller coupled between the bridge device and the CPU. The computer system further comprises a cache memory coupled to the cache controller and providing memory space to the CPU, wherein the cache controller allows communication between the CPU and the bridge device when the CPU communicates using a first protocol and the bridge device communicates using a second protocol, and wherein the cache controller allows communication between the CPU and the bridge device when the CPU communicates using the second protocol and the bridge device communicates using the first protocol.

28 Claims, 4 Drawing Sheets

COMPUTER SYSTEM CACHE CONTROLLER AND METHODS OF OPERATION OF A CACHE CONTROLLER

BACKGROUND

Cache memories and cache controllers may be used on computer systems to improve latency of accessing frequently used data. A cache controller may be placed between a chipset (e.g., a chipset comprising a North bridge, South bridge and possibly other peripheral integrated circuits) and one or more processors (e.g., CPUs). In many computer systems, cache memories may contain a duplicate copy of a portion of a computer's main memory and may be organized in multiple levels (e.g., level one, level two, level three, and level four) according to size and/or proximity to the processor. For example, a level one ("L1") cache memory may be closest to a processor (e.g., on the same substrate as the processor) and may implement a small amount of high performance memory that stores the most commonly requested data. If the processor cannot find the requested data in the L1 cache, the level two ("L2") cache, which may contain a larger segment of memory, may be accessed. The process of searching the next largest cache level for the requested data may continue until the data is found. If the data is not found in one of the cache memories, the main memory may be accessed.

An increasing number of computer systems implement processors and chipsets with different communication protocols and/or physical interfaces. Cache controllers, coupled between the chipset and processor, in these mixed protocol systems may be specifically designed for one interface to communicate with a chipset using a particular protocol, and for a second interface to communicate with the processor using a different protocol. Should any one parameter change (i.e., the device with which an interface communicates or the communication protocol), another specifically designed cache controller may be required.

SUMMARY

The problems noted above are solved in large part by a cache controller that allows communication between a CPU and a bridge device using different communication protocols. At least some embodiments may be a computer system comprising a central processing unit ("CPU"), a bridge device coupled to a main memory, and a cache controller coupled between the bridge device and the CPU. The computer system further comprises a cache memory coupled to the cache controller and providing cache memory space to the CPU. The cache controller allows communication between the CPU and the bridge device when the CPU communicates using a first protocol and the bridge device communicates using a second protocol. The cache controller also allows communication between the CPU and the bridge device when the CPU communicates using the second protocol and the bridge device communicates using the first protocol.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure. In addition, one skilled in the art will understand that the following description has broad application, and the discussion of any embodiment is meant only to be exemplary of that embodiment, and not intended to intimate that the scope of the disclosure is limited to that embodiment.

Figure 1:
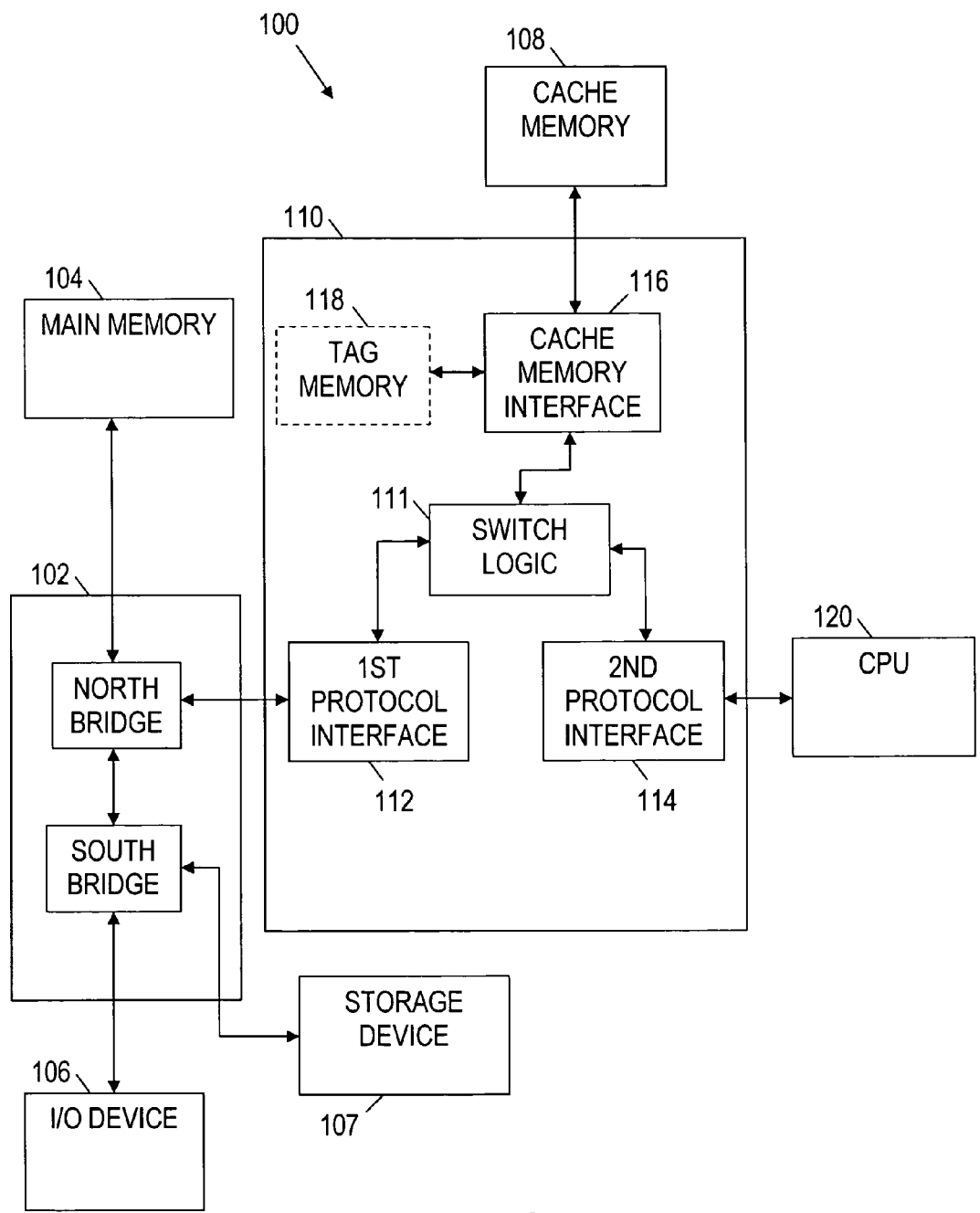
FIG. 1 illustrates a block diagram of a system in accordance with embodiments of the invention.

FIG. 1 illustrates a computer system 100 in accordance with embodiments of the invention. As shown in FIG. 1, the computer system 100 may comprise a cache controller 110 coupled to a chipset 102, a cache memory 108, and a processor ("CPU") 120. The chipset 102, which may comprise a North bridge and a South bridge, may couple the CPU 120 to a main memory 104, an input/output ("I/O") device 106, and a storage device 107. The chipset 102 and the CPU 120 may implement differing communication protocols and differing bus architectures (e.g., the architectures may differ in bus width and/or clock speed). For example, the chipset 102 may be an Intel Architecture ("IA") chipset (e.g., IA-32 chipset) that implements an IA protocol (e.g., IA-32). The CPU 120 may be an Itanium processor family ("IPF") processor which implements an IPF protocol. Alternatively, the chipset 102 may be an Itanium processor family ("IPF") chipset and the CPU 120 may be an IA processor. The various protocols presented are merely exemplary, other protocols may be equivalently used.

Using a communication protocol (such as an IA-32 or IPF protocol) the CPU 120 may access computer readable instructions and/or data (hereinafter collectively or in the alternative just "data") stored in the main memory 104 and the cache memory 108. In accordance with at least some embodiments, the cache memory 108 may store duplicate copies of data such that the CPU 120 may more quickly locate and/or access the data.

In accordance with at least some embodiments, the cache memory 108 may be implemented as a level four ("L4") cache for use with the CPU 120. Accordingly, the CPU 120 may have access to other caches (e.g., cache levels 1–3) which are not shown in FIG. 1. In such embodiments, if a CPU request is not fulfilled by the lower level caches, that CPU request may be forwarded to and processed by the cache controller 110 of the cache memory 108.

By storing data in the cache memory 108, the CPU 120 may access the data without accessing the main memory 104 or other storage mediums. This may provide faster memory accesses for several reasons. For example, in at least some embodiments, the main memory 104 or other storage mediums (hereafter main memory 104) may be significantly larger (i.e., includes more addresses) than the cache memory 108, whereby locating and accessing a particular address takes longer. Additionally, the main memory 104 may be a lower performance memory (i.e., the clocking rate is lower and/or the time it takes to read from and/or write to an address may be longer). Additionally, accessing the main memory 104 through the chipset 102 may increase the time required for memory accesses by adding distance and/or logic between the CPU 120 and the main memory 104. Thus, accessing data stored in the cache memory 108 may enhance the performance of the computer system 100.

Data stored in the cache memory 108 may be organized and/or accessed as directed by the cache controller 110. The cache controller 110 controls the data stored and accessed in the cache memory 108 using a cache memory interface 116 coupled to the cache memory 108 and switch logic 111. The switch logic 111 also may couple a first protocol interface 112 to a second protocol interface 114. Accordingly, the switch logic 111 may direct data between the cache memory interface 116, the first protocol interface 112, and the second protocol interface 114 as will later be described.

In the exemplary system 100 of FIG. 1, the CPU 120 may send a request for data stored at an address location to the cache controller 110 using the second protocol interface 114. The second protocol interface 114 may comprise physical electrical signal lines and logic that interprets data received on the physical electrical signal lines (i.e., a bus interface). Accordingly, the second protocol interface 114 may receive and/or format data using a bus width, data transfer rate, data frame formatting and/or data command encoding according to the protocol used by the CPU 120. The request sent by the CPU 120 may be forwarded from the second protocol interface 114 to the switch logic 111. The communication protocol used between the switch logic 111 and the interfaces 112, 114 and 116 need not necessarily be the same as the communication protocols used by the interfaces 112 and 114 when communicating to external devices (e.g., the CPU 120 and the chipset 102).

The switch logic 111 sends the request from the CPU 120 to the cache memory interface 116, which controls reading and writing accesses to the cache memory 108. The cache memory interface 116 compares the request (e.g., an address location) with address locations stored in a tag memory 118 coupled to the cache memory interface 116. For example, the tag memory 118 may store full or partial main memory address locations of data that is also stored in the cache memory 108. If tag information (e.g., address information) in the tag memory 118 matches the request provided by the CPU 120, referred to as a "cache hit," the cache memory interface 116 may access the requested data from the cache memory 108. The requested data may then be sent to the CPU 120 through the switch logic 111 and the second protocol interface 114. If tag information in the tag memory 118 does not match the information sent by the CPU 120, referred to as a "cache miss," the cache memory interface 116 may forward the request to the chipset 102 through the switch logic 111 and the first protocol interface 112, whereby the main memory 104, the I/O device 106, or the storage device 107 may be accessed to provide the requested data.

To forward the request from the cache controller 110 to the chipset 102, the first protocol interface 112 may prepare the information according to a protocol that differs from the protocol implemented by the CPU 120 such that the chipset 102 may correctly interpret and use the request. Accordingly, the first protocol interface 112 may comprise physical electrical signal lines and logic that interprets/formats data received on the physical electrical signal lines (i.e., a bus interface). Accordingly, the first protocol interface 112 may receive and/or format data using a bus width, data transfer rate, data frame formatting and/or data command encoding according to the protocol used by the chipset 102. For example, the first protocol interface 112 may format requests from an IA-32 protocol into an IPF protocol or vice versa. The chipset 102 may use the request from the CPU 120 to access an address location in the main memory 104 whereby data associated with the address location is returned to the CPU 120 through the cache controller 110.

After the chipset returns the data following a cache miss, the cache controller 110 may store the data in the cache memory 108, and also store tag information in the tag memory 118 such that a future request for the same address will be a cache hit. Finally, the cache controller 110 may forward the requested data to the CPU 120 through the switch logic 111 and the second protocol interface 114. In updating the cache memory, the cache controller 110 may overwrite cache entries containing data that have not been requested recently.

Figure 2:
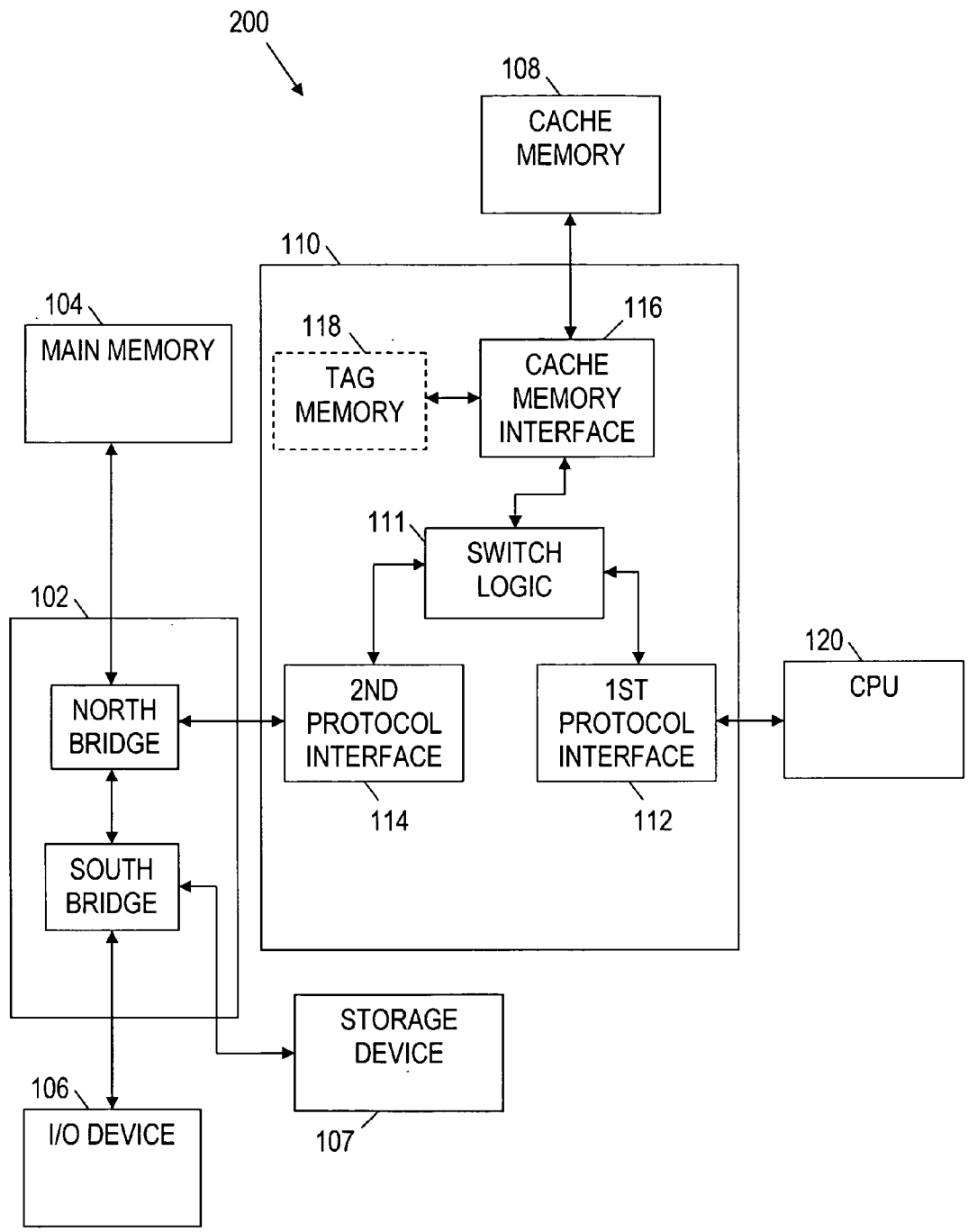
FIG. 2 illustrates a block diagram of a system in accordance with alternative embodiments of the invention.

The interfaces 112 and 114 of a cache controller in accordance with embodiments of the invention, however, are not constrained to communication with just one type of hardware (e.g., just a chipset or just a CPU). FIG. 2 illustrates a system 200 in accordance with alternative embodiments of the invention where the cache controller 110 couples to the chipset using the second communication protocol (unlike FIG. 1 where the chipset uses the first communication protocol), and the cache controller 110 also couples to the CPU using the first communication protocol (unlike FIG. 1 where the CPU uses the second communication protocol). Thus, the system 200 illustrates the ability of the cache controller 110 to function with "opposite" or "reversed" CPU/chipset combinations. Stated otherwise, the cache controller 110 may communicate with either a CPU that implements a first protocol and a chipset that implements a second protocol, or the cache controller 110 may communicate with a CPU that implements a second protocol and a chipset that implements a first protocol.

Figure 3:
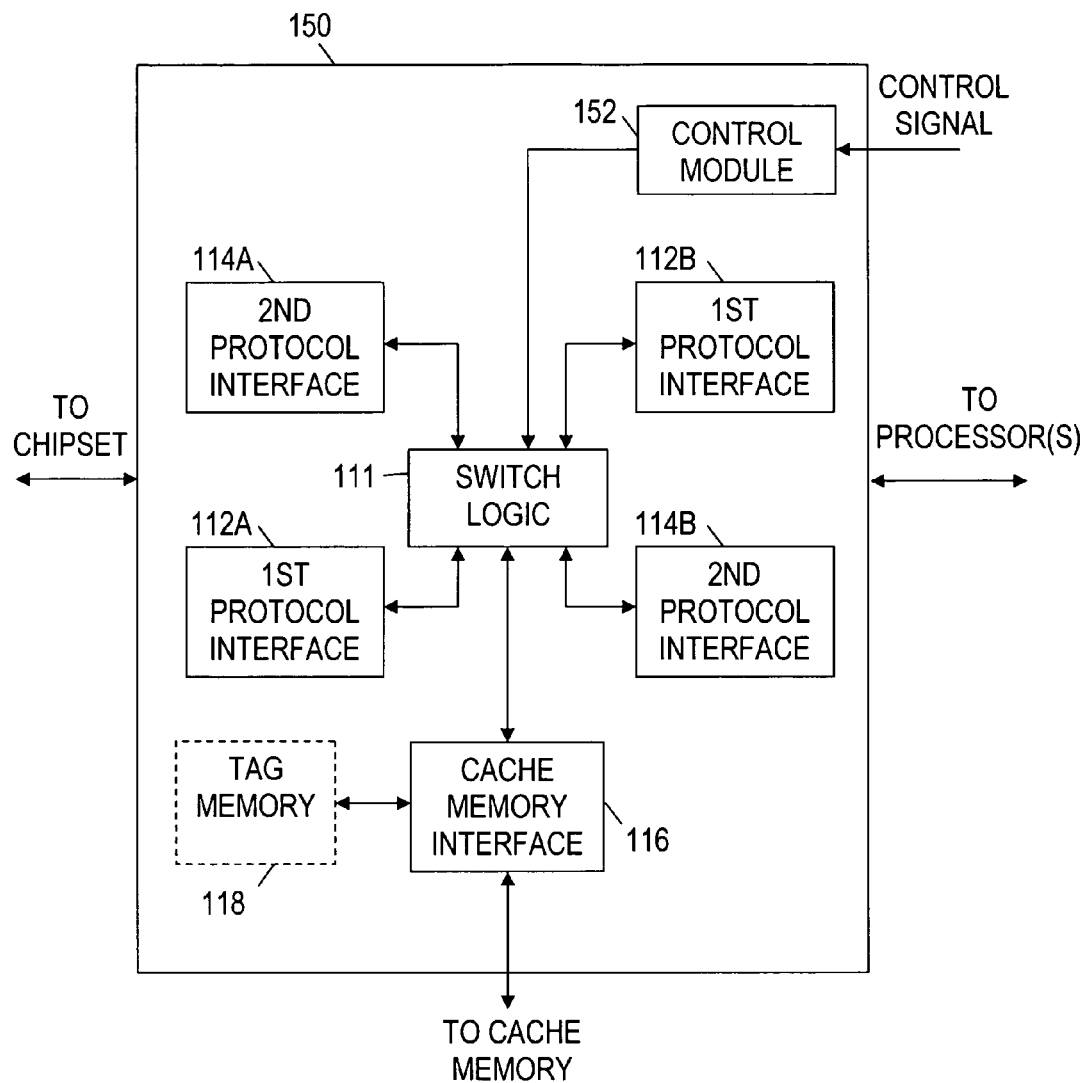
FIG. 3 illustrates a cache controller in accordance with embodiments of the invention.

FIG. 3 illustrates a cache controller 150 in accordance with alternative embodiments of the invention. The cache controller 150 may be configurable to couple to a cache memory, one or more processors, and a chipset. The function of the cache controller 150 is similar in function to the cache controller 110 described for FIGS. 1 and 2 but with the ability to interface a greater variety of processor and chipset combinations. Accordingly, the cache controller 150 may comprise a plurality of first protocol interfaces 112A, 112B and a plurality of second protocol interfaces 114A, 114B coupled to the logic switch 111.

The cache controller 150 may couple between a variety of processor and chipset combinations such as those illustrated in the Table 1 shown below.

TABLE 1

| Cache controller (150) configurations or modes | Processor | Chipset |
| --- | --- | --- |
| 1 | First protocol | First protocol |
| 2 | First protocol | Second protocol |
| 3 | Second protocol | First protocol |
| 4 | Second protocol | Second protocol |

As shown in Table 1, the cache controller 150 may be configured for use in a number of modes in accordance with any combination of chipsets and processors associated with a first and a second protocol. As previously explained, the first and second communications protocols may be an IA-32 protocol and an IPF protocol, respectively. However, the first and second protocols may be selected from any number of protocols now known (e.g., IA-32, IPF, Hyper Transport, PowerPC) or later invented.

In at least some embodiments, a user may configure the cache controller 150 to operate in a particular mode using one or more control signals that couple to the control module 152. For example, by applying a predetermined voltage level for the control signals, a user may configure the cache controller 150 for use with one of the processor/chipset combination modes described above.

The cache controllers 110 and 150 may be implemented as integrated circuits packaged as chips. Therefore, a user may configure a cache controller (e.g., cache controller 110, 150) for use with a particular processor/chipset combination by applying a voltage to (or grounding) one or more predetermined pins of the chip.

Figure 4:
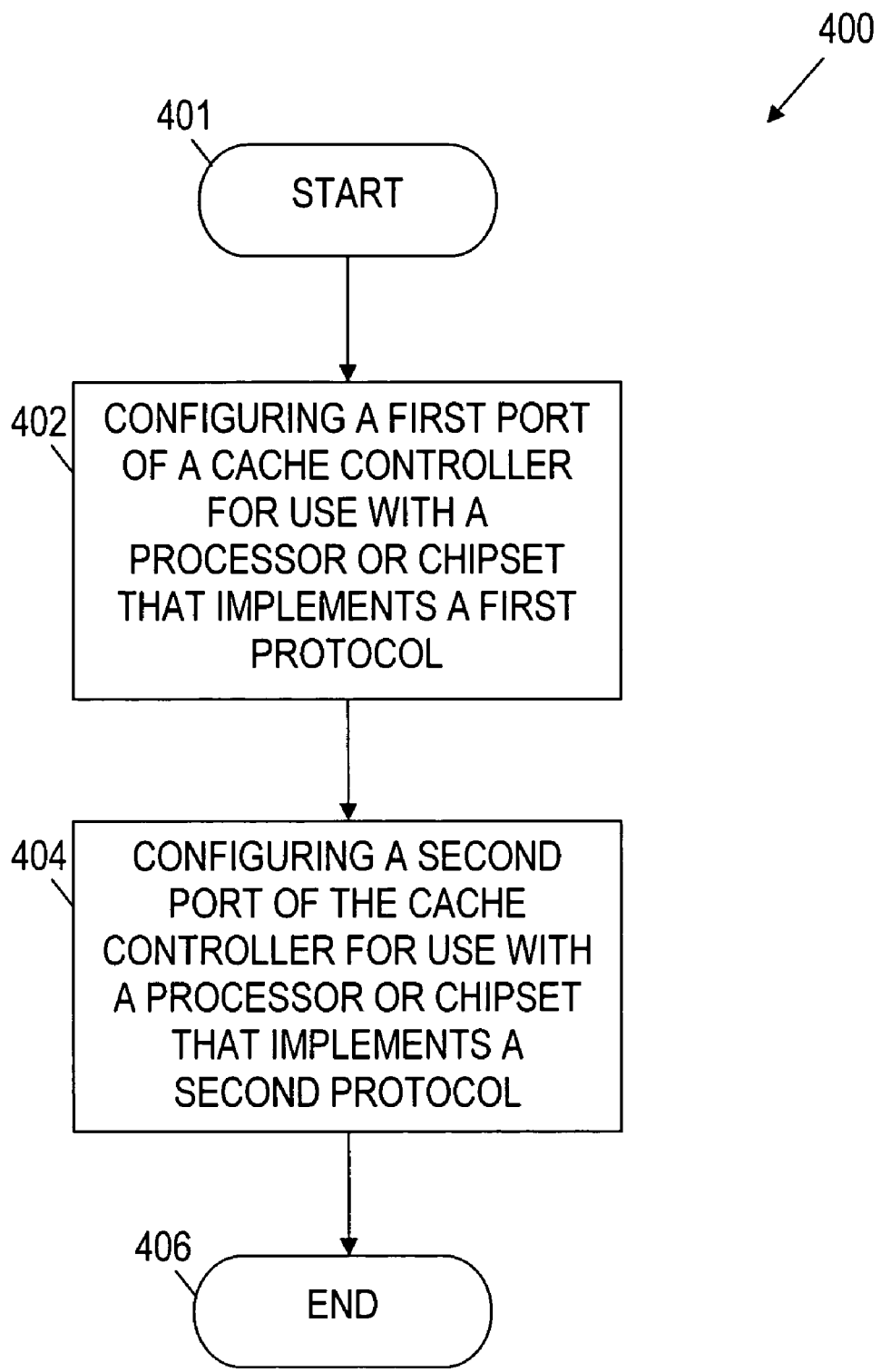
FIG. 4 illustrates a cache control method in accordance with embodiments of the invention.

FIG. 4 illustrates a method 400 in accordance with embodiments of the invention. As shown in FIG. 4, the method 400 may start (block 401) and move to configuring a first port (i.e., interface) of a cache controller for use with a device that implements a first protocol (block 402). For example, the first port may be configured for use with processors or chipsets that implement a first protocol as described above. A second port (i.e., interface) of the cache controller may be configured for use with a device that implements a second protocol (block 404), and thus the process 400 may end (block 406). For example, the second port may be configured for use with processors or chipsets that implement a second protocol as described above.

The above discussion is meant to be illustrative of the principles and various embodiments of the present invention. Numerous variations and modifications will become apparent to those skilled in the art once the above disclosure is fully appreciated. For example, a cache controller may be used with devices that implement more than two communication protocols. In such embodiments, the cache controller design may be adjusted to account for additional protocol interfaces such as those described above. It is intended that the following claims be interpreted to embrace all such variations and modifications.

What is claimed is:

1. A computer system comprising:
   a central processing unit ("CPU");
   a bridge device coupled to a main memory;
   a cache controller coupled between the bridge device and the CPU; and
   a cache memory coupled to the cache controller and providing cache memory space to the CPU;
   wherein the cache controller allows communication between the CPU and the bridge device when the CPU communicates using a first communication protocol and the bridge device communicates using a second communication protocol, and wherein the cache controller allows communication between the CPU and the bridge device when the CPU communicates using the second communication protocol and the bridge device communicates using the first communication protocol.

2. The computer system of claim 1 wherein the cache controller comprises switch logic coupled between a first protocol interface and a second protocol interface, the switch logic implements a communication protocol to transfer information between the first protocol interface and the second protocol interface.

3. The computer system of claim 2 wherein the communication protocol implemented by the switch logic is different from the first and second communication protocols.

4. The computer system of claim 3 wherein the cache controller further comprises a cache memory interface coupled to the cache memory, the cache memory interface is operable to access data stored in the cache memory according to address information provided to the cache controller.

5. A cache controller, comprising:
   a first interface operable to communicate to an external device using a first communication protocol;
   a second interface operable to communicate to an external device using a second communication protocol different than the first communication protocol; and
   a cache memory interface coupled to the first and second interfaces, the cache memory interface controls reading and writing to a cache memory;
   wherein the first interface selectively communicates to an external device being one of a CPU and a bridge device;
   wherein the second interface selectively communicates to an external device being one of a CPU and a bridge device.

6. The cache controller of claim 5 further comprising a control module coupled to the first and second ports, the control module is operable to receive a control signal to select that the first interface communicate to one of the CPU and the bridge device.

7. The cache controller of claim 6 wherein the control module is operable to receive a control signal to select that the second Interface communicate to one of the CPU and the bridge device.

8. The cache controller of claim 5 wherein the cache memory interface determines whether address information from a CPU matches address tags in a tag memory.

9. The cache controller of claim 8 wherein, if the address information matches an address tag, the cache controller provides data from the cache memory to the requesting CPU.

10. The cache controller of claim 8 wherein, if the address information does not match an address tag, the cache memory interface creates a new address tag and designates a memory location in a cache memory to store data associated with the address information.

11. The cache controller of claim 8 wherein, if the address information does not match an address tag, the cache controller forwards the address information to a bridge device coupled to one of the first port and the second port.

12. A method, comprising:
    configuring a first port of a cache controller to communicate to an external device, wherein the first port selectively communicates to one of a CPU and a bridge device using a first communication protocol; and
    configuring a second port of the cache controller to communicate to an external device, wherein the second port selectively communicates to one of a CPU and a bridge device using a second communication protocol.

13. The method of claim 12 further comprising one of:
configuring the first interface to communicate to a CPU and configuring the second interface to communicate to a bridge device; and
configuring the first interface to communicate to a bridge device and configuring the second interface to communicate to a CPU.

14. The method of claim 12 further comprising accessing data in a cache memory and transmitting data to a requesting CPU if address information of a CPU request matches an address tag stored by the cache controller.

15. The method of claim 12 further comprising creating an address tag and designating a location in a cache memory to store data associated with address information of a CPU request if the address information does not match address tags stored by the cache controller.

16. A computer system, comprising:
a central processing unit ("CPU");
a bridge device coupled to a main memory; and
means for reading and writing to a cache memory coupled between the CPU and the bridge device;
wherein said means for reading and writing to the cache memory allows communication between the CPU and the bridge device when the CPU communicates using a first communication protocol and the bridge device communicates using a second communication protocol, and allows communication between the CPU and the bridge device when the CPU communicates using the second communication protocol and the bridge device communicates using the first communication protocol.

17. The computer system of claim 16 further comprising means for determining whether address information from a CPU request matches an address tag stored in the cache controller.

18. The computer system of claim 17 further comprising means for accessing data stored in the cache memory if the address information matches an address tag.

19. The computer system of claim 17 further comprising means for creating a new address tag for association with the address information and designating a memory location in the cache memory for storing data associated with the address information if the address information does not match an address tag.

20. A cache controller, comprising:
a plurality of first communication protocol interfaces that allow communication between the cache controller and at least one of a processor and a bridge device, wherein each of the processor and bridge device communicates using a first communication protocol; and
a plurality of second communication protocol interfaces that allow communication between the cache controller and at least one of a processor and a bridge device, wherein each of the processor and bridge device communicates using a second communication protocol.

21. The cache controller as defined in claim 20 wherein the cache controller allows communication between the CPU and the bridge device when the CPU and the bridge device communicate using a first communication protocol, wherein the cache controller allows communication between the CPU and the bridge device when the CPU and the bridge device communicate using a second communication protocol, wherein the cache controller allows communication between the CPU and the bridge device when the CPU communicates using the first communication protocol and the bridge device communicates using the second communication protocol, and wherein the cache controller allows communication between the CPU and the bridge device when the CPU communication using the second communication protocol and the bridge device communicates using the first communication protocol.

22. The computer system of claim 20 wherein the cache controller comprises a control unit coupled to the plurality of ports, the control unit operable to configure the ports according to a control signal such that the cache controller allows one of:
communication between the CPU and the bridge device when the CPU and the bridge device communicate using a first communication protocol;
communication between the CPU and the bridge device when the CPU and the bridge device communicate using a second communication protocol;
communication between the CPU and the bridge device when the CPU communicates using the first communication protocol and the bridge device communicates using the second communication protocol; and
communication between the CPU and the bridge device when the CPU communication using the second communication protocol and the bridge device communicates using the first communication protocol.

23. A computer system, comprising:
a central processing unit ("CPU");
a bridge device coupled to a main memory;
a cache controller coupled between the bridge device and the CPU; and
a cache memory coupled to the cache controller and providing cache memory space to the CPU;
wherein the cache controller allows communication between the CPU and the bridge device when the CPU and the bridge device communicate using different communication protocols, and wherein the cache controller also allows communication between the CPU and the bridge device when the communication protocols of the CPU and bridge device are reversed.

24. A computer system, comprising:
a processor having an associated communications protocol;
a bridge device having an associated communications protocol;
a cache controller comprising
a plurality of first communication protocol interfaces each allowing communication using an individual one of a plurality of communication protocols;
a plurality of second communication protocol interfaces each allowing communication using an individual one of a plurality of communication protocols; and
wherein the cache controller couples the processor and the bridge device.

25. The computer system as defined in claim 24 wherein each of the processor and the bridge device are coupled to the plurality of first communication protocol interfaces.

26. The computer system as defined in claim 24 wherein each of the processor and the bridge device are coupled to the plurality of second communication protocol interfaces.

27. The computer system as defined in claim 24 wherein the processor is coupled to one of the first communication protocol interfaces, and the bridge device is coupled to one of the second communication protocol interfaces.

28. The computer system as defined in claim 24 wherein each of the processor and the bridge device are coupled to the plurality of second communication protocol interfaces.

* * * * *

UNITED STATES PATENT AND TRADEMARK OFFICE
CERTIFICATE OF CORRECTION

PATENT NO. : 7,149,848 B2 Page 1 of 1
APPLICATION NO. : 10/787444
DATED : December 12, 2006
INVENTOR(S) : Reza Mushtaq Bacchus It is certified that error appears in the above-identified patent and that said Letters Patent is hereby corrected as shown below:

On the title page, item (75), in "Inventor", in column 1, line 1, delete "Mushtag" and insert -- Mushtaq --, therefor.

In column 6, line 43, in Claim 7, delete "Interface" and insert -- interface --, therefor.

Signed and Sealed this

Twentieth Day of January, 2009

JON W. DUDAS
*Director of the United States Patent and Trademark Office*